Jan. 13, 1970  YEN-CHU WANG  3,489,929

FLUIDIC TO ELECTRIC TRANSDUCER

Filed July 28, 1966

INVENTOR
YEN CHU WANG
BY, Richard F. Benway
ATTORNEY

United States Patent Office 3,489,929
Patented Jan. 13, 1970

3,489,929
FLUIDIC TO ELECTRIC TRANSDUCER
Yen-Chu Wang, New York, N.Y., assignor to Shen Ling
Filed July 28, 1966, Ser. No. 568,530
Int. Cl. H03k *11/00*
U.S. Cl. 307—310     5 Claims

ABSTRACT OF THE DISCLOSURE

A back biased Zener diode exposed to fluid flow converts fluidic signal into strong corresponding electrical signals with appropriate speed and fidelity.

---

Figure 1:
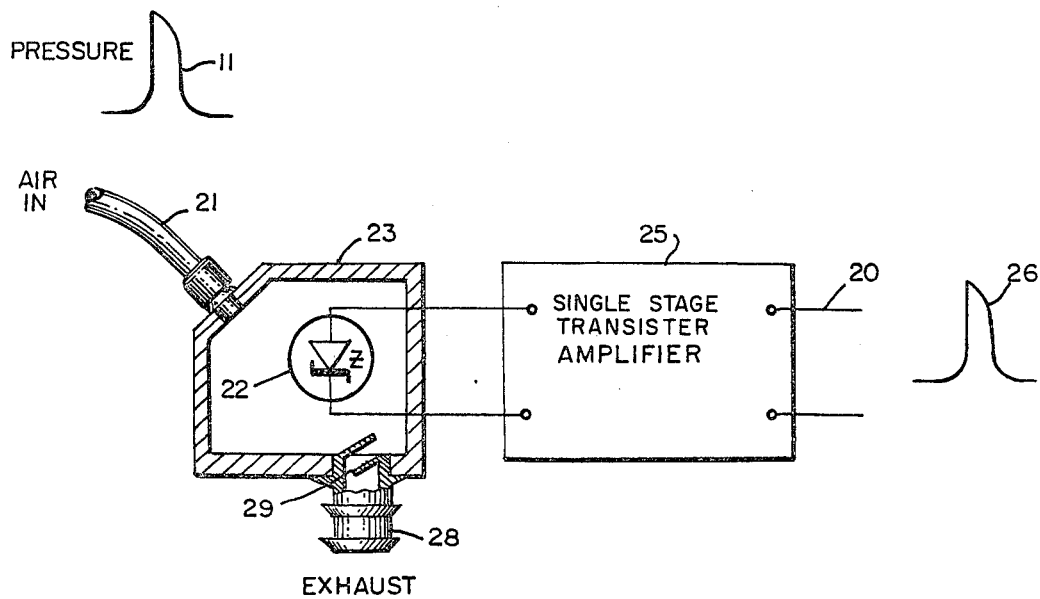

This invention relates to pneumatic to electric transducers, and more particularly to a pneumatic to electric transducer that is a static device which utilizes a semiconductor.

Pneumatic, or more generally, fluid systems have been preferred over electrical systems for many reasons particularly where radiation damage is expected. Pneumatic systems have also been preferred over electric systems where a fire hazard or explosion hazard could be experienced with electric ignition. Another reason for preferring such systems is the fact that pneumatic systems can withstand a wide range of temperatures. Recent developments including inexpensive fluid amplifiers and similar devices, have created an increased interest in pneumatic control systems and even as modern computers. There are many advantages to the use of fluids because the devices are inexpensive, small, completely reliable, and can now be fabricated as complete systems.

There has always been a great need for devices at the interface between pneumatic and electric systems. But with this increased use of fluid devices, the need has sharpened. With an inexpensive transducer, the use of fluid devices would become even more feasible. The present invention provides such a device. The present invention is a highly reliable and inexpensive pneumatic to electric transducer.

There have been a great variety of devices in the prior art for converting pneumatic or fluid signals into electrical signals. This is particularly true in allied fields; for instance, flow meters and anemometers. The only (strictly speaking) true pneumatic to electric transducer has usually been a turbine type device with the obvious disadvantages that: one, it utilizes moving parts with the attendant difficulties bearings, etc. provide; and two, it is dissipative of pneumatic energy. The present invention obviates these disadvantages for it is a static type device.

Flow controls, or rather flow meters, have utilized static type devices as well as turbine type devices. Flow meters have used thermisters. This particular application is quite different from a transducer from the standpoint contemplated in the present invention. A flow meter is concerned only with total flow. Therefore, the transducer in this application can have a long time delay so long as the total output is representative of the flow. The fact that the transducer does not follow precisely the vagaries of fluid flow is not important. In such applications, we also find static type pressure transducers. Although the transducers are quite sensitive they must be put in the flow line as a branch. The pressure transducer then must wait for a pressure build-up. Furthermore, for such a pressure transducer to really sense any signal change in terms of fluid motion, the pressure transducer must be too sensitive. This being the case, such transducers are subject to spurious signals emanating from vibrational sources and occasional shocks. No system can be completely isolated from shock nor can it easily be insulated from vibration. Consequently, such a transducer would have an extremely noisy background in which the signal would be perhaps obscured providing too low a signal to noise ratio.

Another common application for such devices has been in anemometers. Here, another static device in addition to the thermister, has been the hot wire anemometer. The hot wire has substantial thermal inertia and consequently would require specialized circuitry in order to make the device sensitive to changes. Furthermore, the hot wire is extremely sensitive to shock in that it will rupture easily. Another disadvantage of the hot wire is that the resistance due to material boiling off will ultimately change. In order to make the hot wire anemometer accurate by avoiding thermal inertia that characterizes it, a very elaborate circuit was worked out. The circuit included, in addition to the bridge, a DC feedback amplifier. Such a device is called a constant temperature anemometer. It is obvious then that the hot wire anemometer is extremely fragile, costs a great deal, and still is not fast enough to respond to pneumatic signals as contemplated by the present invention.

Thermisters were also used as anemometers. Here again the difficulties they experienced in flow meters would also be experienced in anemometers. Again too, the thermister is, of course depending upon its size, slow in its response to the change in flow that is pneumatic signal. Here, as well is with the hot wire, fragility of the thermister element is a problem. The thermister, again, would not have the response characteristics contemplated by the present invention. Its frequency response, with a constant temperature circuit arrangement similar to that alone would be limited to audio range.

The present invention is directed to a device that will convert a pneumatic signal, either analog or digital, to a corresponding electric signal. The hot wire and the thermister can not achieve such a conversion of pneumatic to electric signal with the fidelity, speed, and inexpensiveness that the present invention provides. The present invention employs a Zener diode with minimal circuit elements.

Therefore, an object of this invention is to provide a simple pneumatic to electric signal transducer.

Another object of this invention is to provide a static pneumatic to electric signal transducer.

Another object of this invention is to provide a pneumatic to electric signal transducer that is not dissipative of pneumatic signal energy.

Another object of this invention is to provide a pneumatic to electric signal transducer free of a noisy background resulting from vibration and shock.

Figure 2:
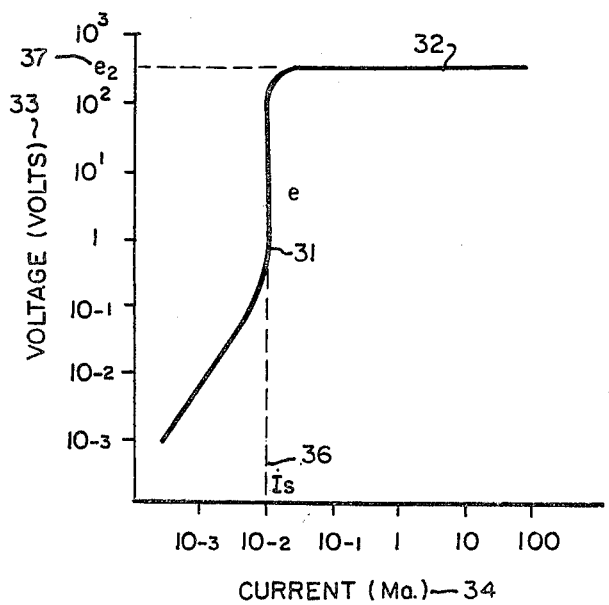

Further objects and features of the present invention will be better understood from the following specifications when read in connection with the attached drawings, of which FIG. 1 is an illustration of an embodiment of this invention; FIG. 2 is a curve of the characteristics of the Zener diode.

Referring to FIG. 1, chamber 23 has an inlet 21 and an outlet 28. Inlet 21 is connected by means of tubing to a source of pneumatic signal. Exhaust 28 also by means of tubing has been connected to any utilization point or control. Zener diode 22 is disposed conveniently within the chamber such that air or pneumatic signal entering tube 21 impinges on the Zener diode before it exits at exit 28. A pulse of pneumatic signal 11 will cause the Zener diode temperature to be reduced as will be explained further. By means of amplifier 25 a corresponding electric signal appears at its output terminals—an electric signal 26 that corresponds accurately with the pneumatic input signal 21.

Also within chamber 23, and at exhaust 28, is shown a check valve 29. The check valve is interposed for the purpose of preventing spurious pneumatic pressure variations from back up within the system and causing signals to appear in the Zener diode. Some baffle arrangement may also be provided that will prevent back up signals from appearing on the Zener diode. It is obvious that the Zener diode must have an elevated temperature; or at least a temperature something higher than the air temperature of the pneumatic air pressure signal.

Amplifier 25 can be as elaborate as desired. However, a simple single stage transistor amplifier will be satisfactory. A pneumatic input of only a few p.s.i. will produce an electric signal output of a few volts with only a single stage of transistor amplifier having moderate gain.

A close examination of the gas characteristics will show that any number are very close together in thermal qualities indicating that pneumatic signal that is borne on any gas that has a temperature substantially below that of the Zener diode, the signals will be substantially consistent with various temperatures of the gas. That is to say, that if the gas temperature is at least ½ the temperature of the Zener diode, the signal will be nearly identical to a signal wherein the gas or pneumatic air temperature is ¼ or ⅓ or ⅛ or even a much lower fraction.

It should be clearly obvious that the moving air will take on more thermal energy from the Zener diode as it passes it. It cannot be compared directly in temperature on a one to one basis for the air is in motion and consequently the signal output will correspond to the change in air flow rather than the absolute temperature difference between the gas temperature and the temperature of the Zener diode at any one moment.

Referring to FIG. 2, we see the characteristic curve of a Zener diode. The present invention requires that the Zener diode be biased to a voltage $E_z$–37. With this bias, the Zener diode will operate thermally along the segment of curve E–32. The current will then vary lineally as we will illustrate further by means of equations along this line, provided however that the current is not permitted to drop below the saturation current $I_s$–36. Comparing this curve with that of a thermister or a varistor, one would see that the relationship would be somewhat complex for the Zener diode would have the straight line while the thermister or varistor would have a substantially curved line, not permitting accurate prediction of the electrical output with the corresponding pneumatic input.

In a Zener diode two types of semi-conductor material are used—a "P" type as an "N" type. If the P-N junction in reverse bias as indicated in the material spoken above, the reverse saturation current would have two components—one part contributed by the holes thermally generated in the N region and diffused to the junction, and also the current contributed by the electrons thermally generated with the P region which is diffused to the junction. This can be expressed in terms of reversed saturation current according to the following formula:

$$I_s = I_{gn} + I_{gp} = A \frac{(\mu_p/\mu_n)KT\sigma_i^2}{(1+\mu_n/\mu_p)^2} \left(\frac{1}{L_n\sigma_p} + \frac{1}{L_p\sigma_n}\right)$$

where $\mu_n$ is the electron mobility and $\mu_p$ the hole mobility and $\sigma_i$ is the intrinsic conductivity of the material, $\sigma_n$ the conductivity of the N region and $\sigma_p$ the conductivity of the P region, $L_p$ the diffusion length of the holes in the N region, $L_n$ is the diffusion length of the electrons in the P region; $e$ is the electron charge, K is the Boltman constant, and T represents temperature degrees Kelvin. A more sophisticated expression for the above equation could be written as follows:

$$I_s = A_e A_o \left(\frac{D_p}{N_d L_p} + \frac{D_n}{N_a L_n}\right) T^3 \epsilon^{(-V_g/V_t)}$$

which reduces approximately to: $I_s \approx KT^3$ where $N_d$ is the concentration of donor atoms, $N_a$ is the concentration of acceptor atoms, $D_p$ is the diffusion constant for holes, the $D_n$ is the diffusion constant for electrons, $A_o$ a constant depending on the materials used, $V_g$ is the bond energy in electron volts while $V_t$ the electron volt equivalent of temperature degrees Kelvin.

The foregoing equations indicate clearly that the reverse saturation current depends to a great extent upon temperature. For that matter, with a given material, the saturation current is directly related to the temperature change. Consequently it is clearly established that the Zener diode is lineally affected by temperature change. For a complete discussion of the above relationships see, "Vacuum-Tube and Semi-conductor Electronics," by Jacob Millman, McGraw-Hill Publisher, pages 124 to 132.

With the given mathematical expression above, and the curve of the Zener diode as found in FIG. 2, we see that the pneumatic signal can be converted into a varying current due to the thermal change of the Zener diode. With a given pneumatic signal directed in such a manner that the Zener diode is engulfed by the jet of air, a current that is circulating through the Zener diode will vary in direct correspondence with that pneumatic signal. That is, if the pulse of pneumatic fluid causes an increase in pneumatic material passing the Zener diode, the current will decrease with that signal. The current variation, then, will track accurately the pneumatic variation. This permits an analog pneumatic signal to be utilized. The Zener diode will sense this analog pneumatic signal and will generate a corresponding change in current flow in a Zener diode. It is obvious that the Zener diode will heat the pneumatic signal slightly. However, this dose not affect the pneumatic signal in any way, thus illustrating that the present invention does not dissipate pneumatic signal strength in any manner. On the other hand, a turbine type device would necessarily extract a substantial amount of signal strength from the signal source, thus loading down the pneumatic source of signal energy. It is also obvious that a pulse or chain of pulses from the digital signal in the pneumatic jet would also generate a corresponding string of pulses representing the pneumatic signal in a chain of electrical current pulses. The Zener diode has a time response limitation, obviously. However, the time response of the Zener diode is measurable in terms of milliseconds, that is, it could handle audio and slightly above audio signals. A thermistor's response, as well as a hot wire, would be in terms of seconds.

The present invention requires an amplifier which also will bias the Zener diode and amplify the current change into a corresponding output voltage. Such amplifiers are well known in the art, and will not be discussed further here.

Ambient temperature presents no real problem, providing however that the Zener diode temperature is above that of the pneumatic signal which is merely a matter of calibration. The signal response to the pneumatic signal will be a closely corresponding electrical output provided, however, as indicated earlier that the Zener diode has a higher temperature.

Owing to the characteristics of the Zener diode, as evidenced by the FIG. 2, no elaborate means for correcting or compensating for vagaries in signal need be provided as is necessary in a hot wire or thermistor having constant temperature features. All that is required is a simple Zener diode, which in itself is very inexpensive, and a single stage amplifier, which is also inexpensive. Prior art devices specifically hot wire anemometers, require a substantial amount of circuitry and elaborate equipment to provide signal outputs which still can not correspond in terms of time response with the present invention. The present invention could also be adapted for use in a flow meter or anemometer just as hot wire and thermistor were so used—but much more cheaply, and with greater ruggedness and reliability. On the other hand, the hot wire or thermistor never were and could not satisfactorily be used as a pneumatic to electric signal transducer.

Although my invention has been illustrated in terms of specific apparatus, it will be clearly understood that others skilled in the art, may, by various substitutions, duplicate the present invention without departing from the true scope and spirit of my invention.

I claim:
1. A pneumatic to electric transducer comprising,
   a pneumatic signal source,
   means for directing pneumatic fluid emanating from said pneumatic signal source,
   a Zener diode,
   said directing means directing said fluid in such a manner as to engulf said semi-conductor thereby controlling its temperature,
   means for controlling the environment surrounding said semi-conductor to exclude said spurious signals,
   means for biasing said semi-conductor to a preselected voltage,
   amplifier means responsive to the temperature change of said semi-conductor,
   said amplifier providing an electrical output corresponding to the pneumatic signal input.
2. A pneumatic to electric transducer according to claim 1 wherein said amplifier is a single stage transistor amplifier.
3. A pneumatic to electric transducer according to claim 2 wherein said bias is a reverse bias applied to said Zener diode.
4. A pneumatic to electric transducer according to claim 3 wherein said means for controlling the environment surrounding said Zener diode is a metallic body having an inlet and an outlet with baffles disposed within said body to divert fluid entering said outlet away from said semi-conductor.
5. A pneumatic to electric transducer according to claim 4 wherein said inlet is disposed in said body and so shaped that fluid entering said inlet is directed to said semi-conductor so as to engulf said semi-conductor.

References Cited

UNITED STATES PATENTS

| 2,972,684 | 2/1961 | Elliot et al. | 307—308 X |
| 3,153,934 | 10/1964 | Reilly | 73—399 X |
| 3,184,972 | 5/1965 | Sikorski | 307—308 X |
| 3,216,249 | 11/1965 | Joel | 73—399 X |
| 3,247,718 | 4/1966 | D'Onofrio | 307—308 X |
| 3,269,174 | 8/1966 | Linville. | |

OTHER REFERENCES

Bukstein: "The Backward Diode," Radio-Electronics, November 1958, p. 35.

ROY LAKE, Primary Examiner

JAMES B. MULLINS, Assistant Examiner

U.S. Cl. X.R.

73—399; 307—518